J. GANEY.
DUMPING WAGON.
APPLICATION FILED MAR. 29, 1912.
1,030,884.
Patented July 2, 1912.
2 SHEETS—SHEET 2.
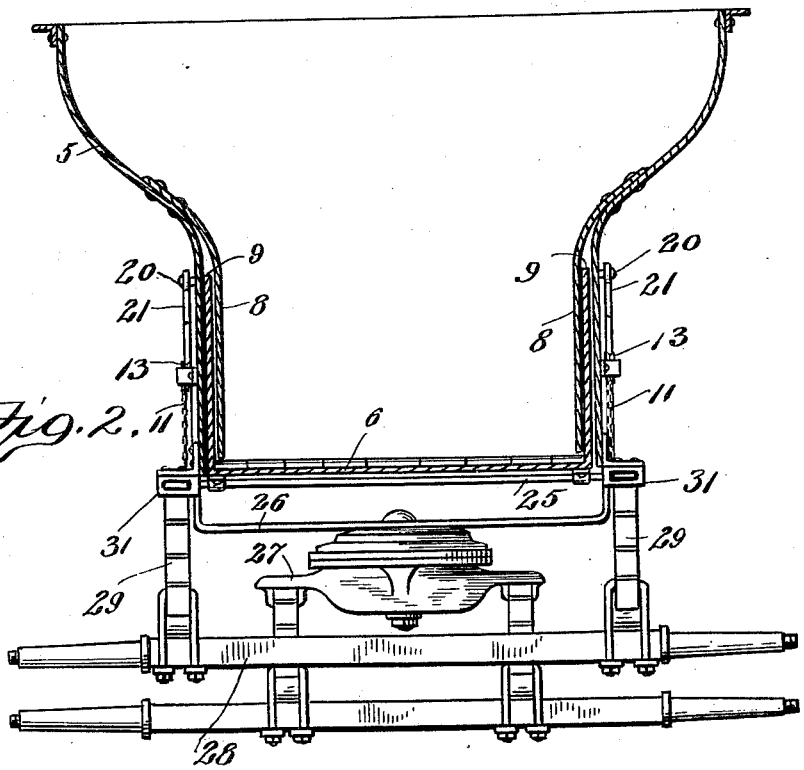
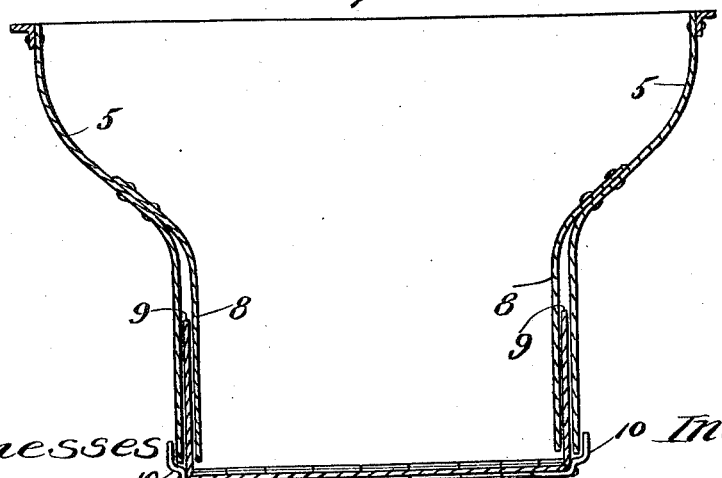

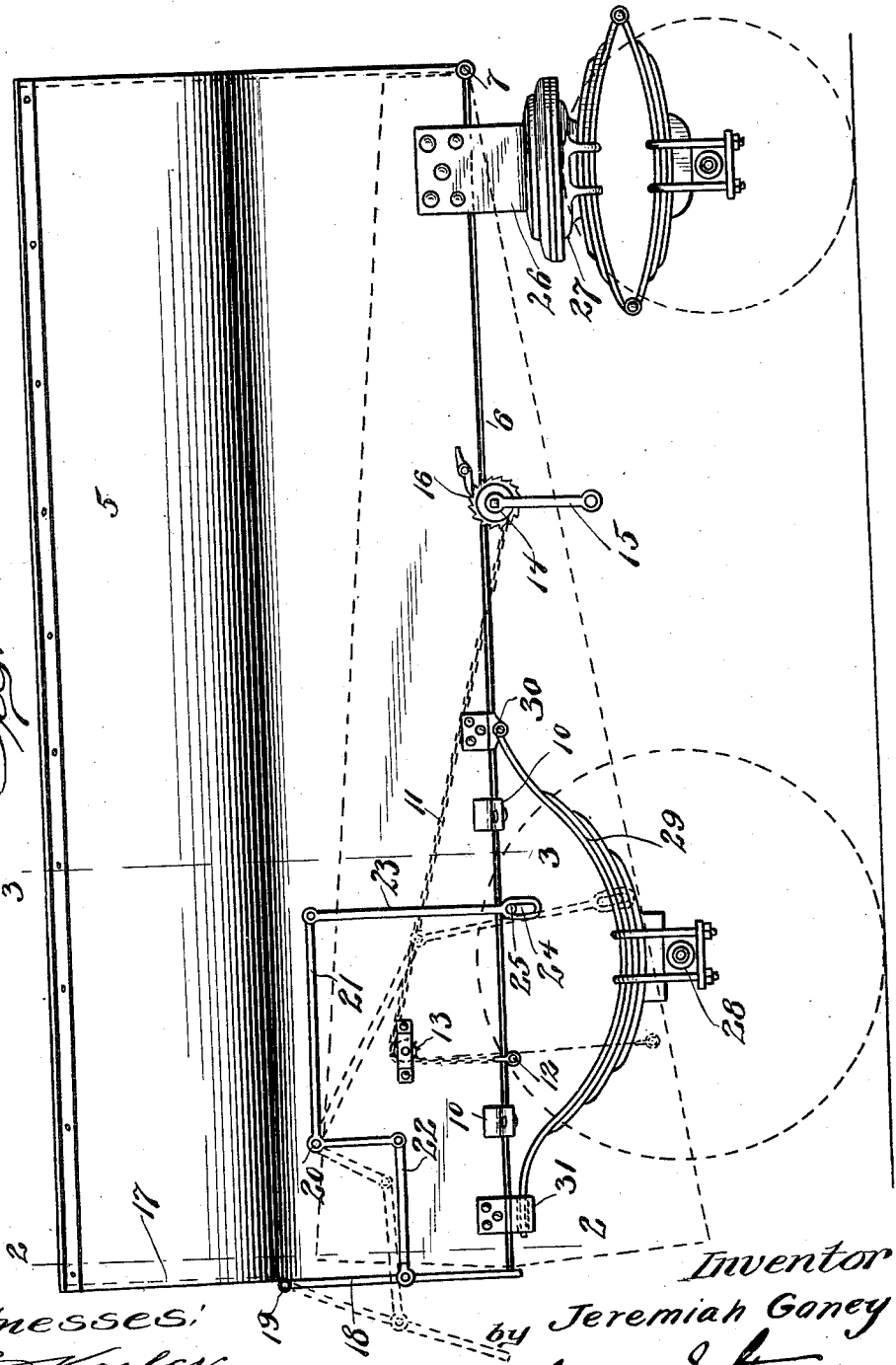

UNITED STATES PATENT OFFICE.

JEREMIAH GANEY, OF CHICAGO, ILLINOIS.

DUMPING-WAGON.

1,030,884.　　　Specification of Letters Patent.　　Patented July 2, 1912.

Application filed March 29, 1912. Serial No. 687,023.

*To all whom it may concern:*

Be it known that I, JEREMIAH GANEY, a citizen of the United States, residing at Chicago, in the county of Cook and State of Illinois, have invented certain new and useful Improvements in Dumping-Wagons, of which the following is a specification.

This invention has for its object to provide a wagon box structure which enables the load to be easily and quickly dumped. The box has a tilting bottom, and a swinging end-gate, which latter automatically opens when the bottom is tilted to dump the load.

The invention also has for its object to provide an improved structure of the kind stated which is strong and durable, and devoid of complicated parts to get out of order.

With these objects in view, the invention consists in a novel construction and arrangement of parts to be hereinafter described and claimed, reference being had to the accompanying drawings in which—

Figure 1 is a side elevation of the wagon, Figs. 2 and 3 are cross-sections on the line 2—2 and 3—3, respectively, of Fig. 1.

Referring specifically to the drawings, 5 denotes the stationary side-walls of the wagon box. The bottom or floor 6 of the box is pivoted at its forward end to a transverse rod 7 carried by the side-walls at the corresponding end of the box. This pivotal connection allows the bottom to be tilted downward as shown by dotted lines in Fig. 1. To the lower portion of each side-wall is secured a strip 8, the latter being located inside the box and spaced from the side-wall. Into the space between the side-walls and the aforesaid strip loosely extend upstanding flanges 9 on the longitudinal edges of the bottom 6, whereby the latter is guided as it is swung up or down. Clips 10 carried by the bottom engage the bottom edge of the side-walls when said bottom is in normal or carrying position. The bottom 6 is raised or lowered by means of a hoisting device comprising a chain 11 secured to a cross-rod 12 carried by the bottom, said chain passing forward to a winding device 14 having an operating handle 15, and a suitable pawl-and-ratchet mechanism 16 to prevent backslip. A hoisting device as herein described is located on both sides of the wagon box.

The upper portion of the rear end of the box is closed by a wall 17, and below said wall is located a swinging end-gate 18 which forms a closure for the rear end of the box. The gate is hinged at its upper end, as indicated at 19, and means are provided for automatically swinging the gate open when the bottom is tilted down to dump the load. These means comprise the following parts: To the side-wall 6, on the outside thereof, is pivoted, as indicated at 20, an angle-lever 21 having one of its branches connected by a link 22 with the gate 18. To the other branch of the angle-lever is connected a link 23 having a slot 24 into which extends one end of a transverse rod 25 carried by the bottom 6. A similar gate-operating mechanism is located on the other side of the wagon box.

In operation, when the bottom 6 tilts downward to dump the load, the angle-lever 21 is swung on its fulcrum by reason of the connection 23 between said lever and the bottom, and through the connection 22 the gate is swung open as shown by dotted lines in Fig. 1. The front end of the side-walls 5 carry a cross-beam 26, which latter carries the front running gear 27 of the wagon. The rear axle 28 is supported by semi-elliptical springs 29 carried by the side-walls 6, said axle being located a sufficient distance from the bottom 6 so as not to interfere therewith when it is tilted. One end of the spring 29 is made fast to the side-wall, as indicated at 30, and the other end is loosely supported in a box 31 so that it may slide back and forth therein, as the spring is flexed.

The preferred embodiment of the invention has been shown, but it will be evident that various minor changes in the structural details may be made without a departure from the spirit and scope of the invention.

I claim:

1. A wagon box comprising side-walls having spaced strips secured thereto, a bottom pivoted at its forward end to tilt downward, said bottom having upstanding flanges at its longitudinal edges working in the space between the side-walls and the strips, and a hoisting device connected to the bottom.

2. A wagon box having stationary side-walls and a bottom pivoted at its forward end to tilt downward, a pivoted end-gate, an angle-lever mounted on the side-wall of the wagon box, a connection between one branch of the lever and the gate, and a connection between the bottom and the other branch of the lever.

In testimony whereof I affix my signature in presence of two witnesses.

JEREMIAH GANEY.

Witnesses:
H. G. BATCHELOR,
S. J. LEHRER.